US012743203B2

(12) United States Patent
Mörz

(10) Patent No.: US 12,743,203 B2
(45) Date of Patent: Sep. 22, 2026

(54) METHOD FOR EVALUATING OPERATING GESTURES ON A TOUCH-SENSITIVE INPUT SURFACE AND CORRESPONDING DEVICE

(71) Applicant: MERCEDES-BENZ GROUP AG, Stuttgart (DE)

(72) Inventor: Sebastian Mörz, Sindelfingen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 286 days.

(21) Appl. No.: 18/832,717

(22) PCT Filed: Dec. 7, 2022

(86) PCT No.: PCT/EP2022/084738
§ 371 (c)(1),
(2) Date: Jul. 24, 2024

(87) PCT Pub. No.: WO2023/143791
PCT Pub. Date: Aug. 3, 2023

(65) Prior Publication Data

US 2025/0156065 A1 May 15, 2025

(30) Foreign Application Priority Data

Jan. 25, 2022 (DE) ..................... 10 2022 000 261.2

(51) Int. Cl.
*G06F 3/04883* (2022.01)
*B60K 35/10* (2024.01)
(Continued)

(52) U.S. Cl.
CPC .......... *G06F 3/04883* (2013.01); *B60K 35/10* (2024.01); *B60K 35/22* (2024.01); *B60K 35/81* (2024.01); *G06F 3/0418* (2013.01)

(58) Field of Classification Search
CPC .... G06F 3/04883; G06F 3/0418; G06F 3/017; G06F 3/04186; G06F 3/04842;
(Continued)

(56) References Cited

U.S. PATENT DOCUMENTS 8,970,525 B1 3/2015 de los Reyes
11,995,298 B1 * 5/2024 Rubinstein ............ G06F 3/0418
(Continued)

FOREIGN PATENT DOCUMENTS

EP 2876526 A1 5/2015
EP 3117293 B1 9/2020
(Continued)

OTHER PUBLICATIONS

Office Action dated Sep. 16, 2025 in related/corresponding KR Application No. 2024-7018154.
(Continued)

*Primary Examiner* — Kenny Nguyen
(74) *Attorney, Agent, or Firm* — PATENT PORTFOLIO BUILDERS PLLC

(57) ABSTRACT

Operating gestures on a touch-sensitive input surface for controlling a display element are evaluated using characteristic data belonging to an operating gesture from a point in time t1 to a point in time tend. Control signals are continuously determined from the input positions comprised by the characteristic data of POS(t1) to POS(tend) for controlling the display element on the display unit. Characteristic data belonging to the operating gesture is evaluated and the gesture classified regarding a degree of error by a pre-trained algorithm trained. If the degree of error lies below a predetermined threshold value, then the determined control signals are conveyed to the display unit. If the degree of error in a period of time from t2 to t3 with t1<t2<t3≤tend lies above the predetermined threshold value, conveying of the
(Continued)

Figures 1, 2A, 2B, 2C, 2D, 2E, 2F:
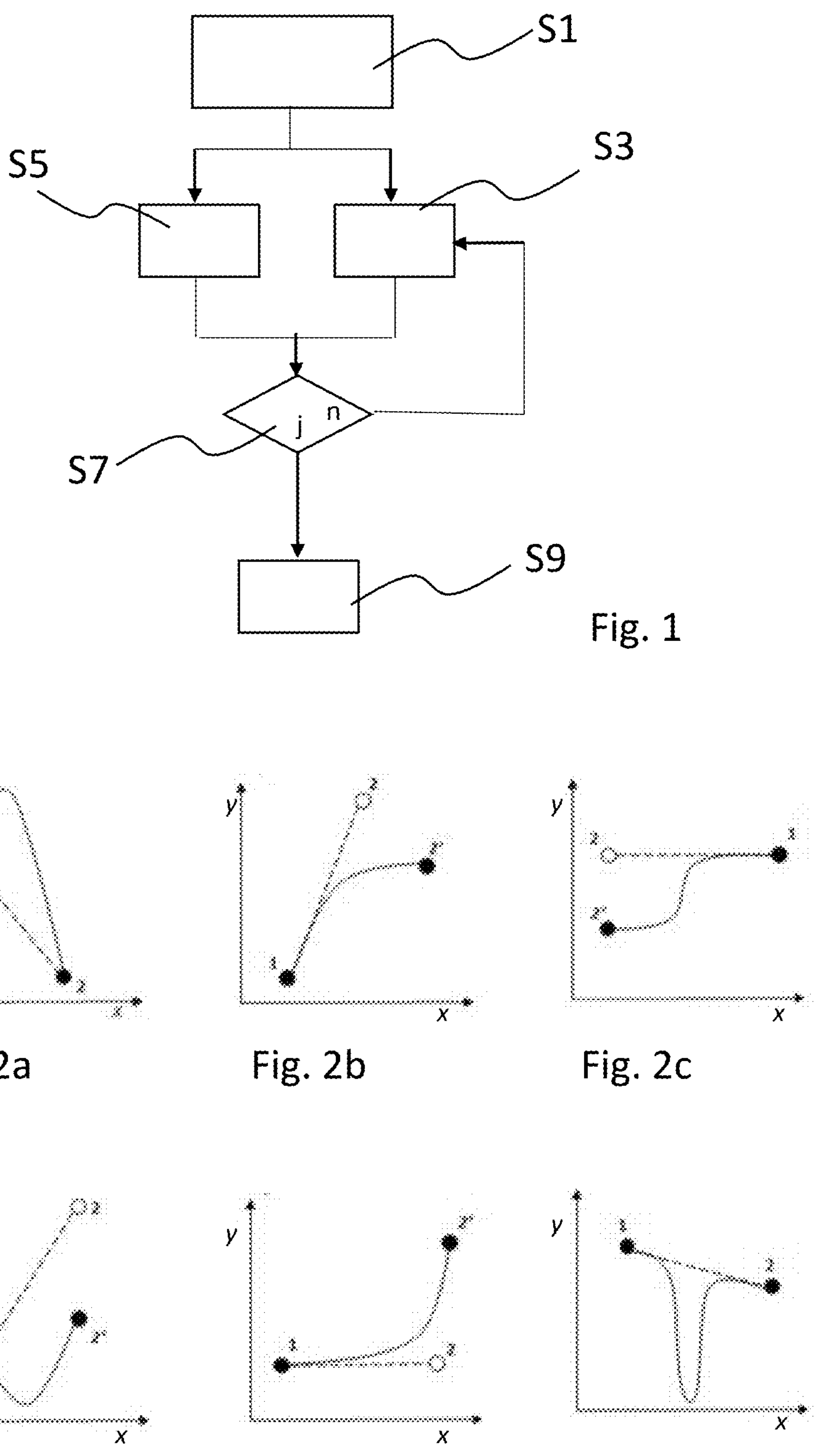

control signals determined in the period of time from t2 to t2'≤t3 is suspended.

9 Claims, 3 Drawing Sheets

(51) Int. Cl.
*B60K 35/22* (2024.01)
*B60K 35/81* (2024.01)
*G06F 3/041* (2006.01)

(58) Field of Classification Search
CPC ....... G06F 3/0482; B60K 35/10; B60K 35/22; B60K 35/81; B60K 2360/1434
See application file for complete search history.

(56) References Cited

U.S. PATENT DOCUMENTS

2007/0152976 A1* 7/2007 Townsend ........... G06F 3/03545 345/173
2013/0009896 A1 1/2013 Zaliva
2013/0033448 A1* 2/2013 Yano ....................... G06F 3/018 345/173
2017/0371486 A1* 12/2017 Neiswander .......... G06F 3/0488
2019/0391723 A1* 12/2019 Wang .................. G06F 3/04186
2020/0228641 A1* 7/2020 Chen ....................... G06F 9/451
2020/0326824 A1* 10/2020 Alonso ............... G06F 3/04166
2021/0181919 A1* 6/2021 Agarwal ................. G06F 17/18
2021/0294473 A1 9/2021 Hornang
2021/0306569 A1* 9/2021 Hatanaka ................ G06F 3/016
2023/0161552 A1* 5/2023 Bao ......................... G10L 15/22 715/728

FOREIGN PATENT DOCUMENTS

KR 101836742 B1 3/2018
KR 1020190104101 A 9/2019

OTHER PUBLICATIONS

International Search Report and Written Opinion mailed Mar. 14, 2023 in related/corresponding International Application No. PCT/EP2022/084738.

Office Action created Jan. 18, 2023 in related/corresponding DE Application No. 10 2022 000 261.2.

Office Action dated Aug. 4, 2023 in related/corresponding EP Application No. 22 830 815.1.

* cited by examiner

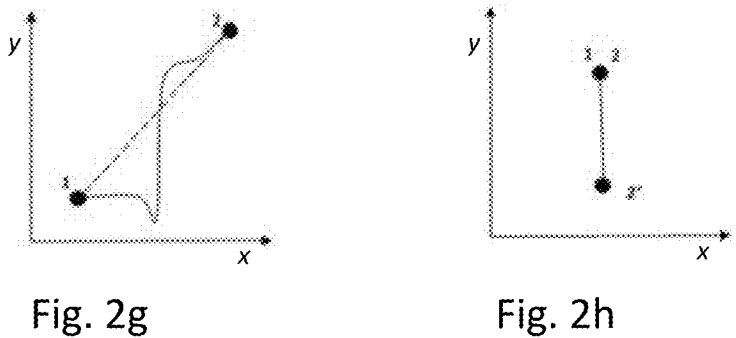
Fig. 2g
Fig. 2h
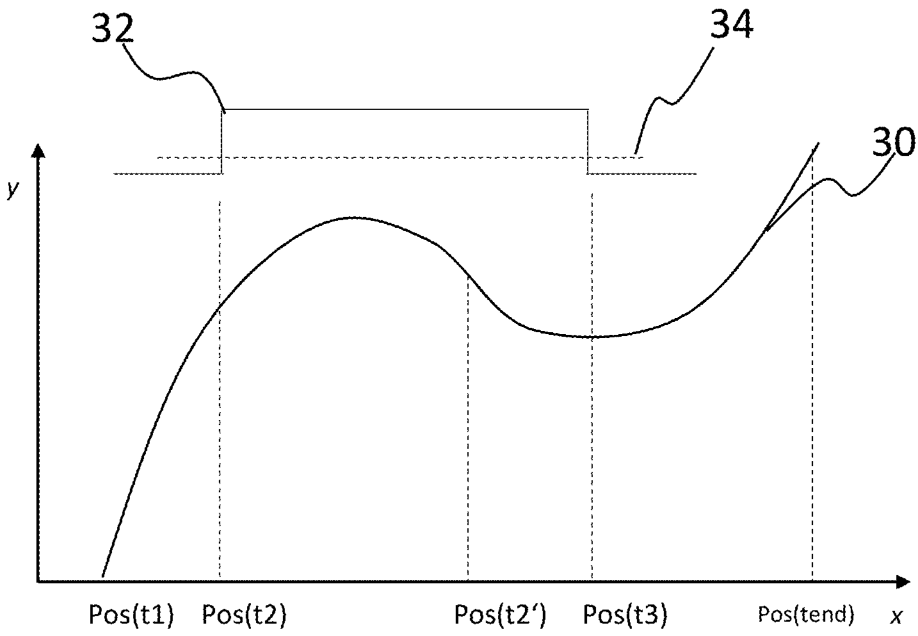
Fig. 3

METHOD FOR EVALUATING OPERATING GESTURES ON A TOUCH-SENSITIVE INPUT SURFACE AND CORRESPONDING DEVICE

BACKGROUND AND SUMMARY OF THE INVENTION

Exemplary embodiments of the invention relate to a method for evaluating operating gestures on a touch-sensitive input surface to control a display element, formed for selecting an object, on a display unit allocated to the input surface, and a device with means for evaluating operating gestures on a touch-sensitive input surface.

A touch-sensitive input surface is known on laptops or in vehicles by means of which a display element can be controlled on an allocated, spatially offset display unit. The display element, formed as a cursor, for example, is set up to select objects, wherein here, a function allocated to the object is triggered without further steps or after carrying out a further operating action, for example triggering a switching function by exerting an increased pressure on the input surface.

U.S. Pat. No. 8,970,525 B1 discloses a method for attenuating springing or shaking of a cursor that is not intentional by the user on a display unit when inputting on a touch-sensitive surface. Characteristic data comprising input positions are ascertained for a gesture carried out by a user, the data being taken as a basis for determining control signals for controlling the cursor on the display unit. Upon recognizing a decreasing pressure on the input surface, a lifting finger is detected and a movement of the display element on the allocated display unit is blocked.

In contrast, exemplary embodiments of the invention provide a method and a device in which an unintended choice and/or selection of objects selected by means of gestures is avoided.

In the method according to the invention, characteristic data corresponding to the operating gestures are evaluated, and the gestures are classified in regard to an error degree by means of a pre-trained algorithm, wherein, if the error degree lies below a predetermined threshold value, the control signals determined from the characteristic data of the gestures are continuously conveyed to the display unit and, if the error degree in a period of time from t2 to t3 with t1<t2<t3≤tend lies above the predetermined threshold value, conveying the control signals determined in the period of time from t2 to t2'≤t3 to the display unit is suspended.

With a sufficient number of input positions, i.e., of position data as xy-coordinates as characteristic data, a kind or a type of gesture can be predicted and/or determined by means of the process. Gestures are here to be substantially understood as swiping gestures on the input surface. For the classification of the gestures or a part of the gestures, a classification of the determined type, learned from historic data, is ascertained from the characteristic data by means of the pre-trained algorithm. Along with the input positions, the characteristic data of the gestures, for example, can further comprise a finger contact surface, a finger contact surface change, a finger contact force, a finger contact force change, a finger movement speed or a finger movement speed change. If there is still no degree of error or a degree of error lying below a predetermined threshold value present with the gesture, then the determined control signals are continuously output to the display unit for controlling the display element. Continuously conveying is here to be understood to mean that generated control signals are conveyed without significant delay to the display unit, i.e., for example in the calculating cycle of generation or in the calculating cycle following the generation. The degree of error here reflects the reliability of the position data ascertained, a low degree of error stands for a high degree of reliability and vice versa. The display element for selection comprises, for example, a cursor pointing to an object, a brightening and/or of the region surrounding the object.

As soon as it is recognized at the point in time t2 that the gesture has a degree of error lying above the predetermined threshold value, the conveying of the control signals determined in the period of time from t2 to t2'≤t3 is suspended. The control signals established based on the input positions are continuously further calculated yet not conveyed to the output unit until a timer has expired at t2'<t3 or the degree of error at the point in time t2'=t3 again lies above the predetermined threshold value. After t2', i.e., at the latest after t3, the control signals are then emitted again to the display unit until tend. The period of time between t2 and t2' can be adjusted depending on the degree of error, with high degrees of error t2'=t3 correspondingly applies. The point in time t2' can also coincide with tend if t2'=t3 and t3=tend, in this case, from point in time t2, no further control signals are emitted, and the cursor remains on the display unit until the end of the gesture in the position set at point in time t2.

The control signals are determined from delay vectors. Delay vectors are calculated and added up from the detected input positions, the direction and length of the movement of which delay vectors is compared to internal threshold values. Upon exceeding these threshold values, the control signals are generated corresponding to the calculated movement. Here, the control signals can include adjustments based on filters and geometric parameters and adjustments to the respective output unit. To determine the control signals, at any point in time, several input positions lying before this point in time, preferably all input positions from the start of the gesture, are taken into consideration corresponding to present intermediary capacities, such that implausible input positions for determining the control signals can be filtered out via the corresponding filters. The longer the conveying of the control signals determined in the period of time from t2 to t2'≤t3 is suspended, the more input positions are available to the filters and evaluation algorithms for determining the control signals, such that implausible input positions and outliers carry less weight or can be eliminated.

The method is suitable, in particular, for input surfaces associated with tipping, rolling, or a pressure change of the operating finger when carrying out the operating gesture due to their geometric arrangement. An input surface arranged on a steering wheel is usually operated with a thumb. The hand of a user here comprises the steering wheel rim, the thumb for operating is moved in relation to the hand to implement gestures. By tipping and/or changing the contact pressure, the contact surface of the thumb is changed. From the contact surface, coordinates of the touch position, i.e., the position data, are ascertained by determining the center of an area, for example. The change of the touch position connected to the change of the contact surface is here superimposed by the change of the touch position caused by shifting the thumb, whereby objects are unintentionally selected on the display unit and/or corresponding functions triggered.

In a further design of the method, the data of the gestures is evaluated and classified by an algorithm trained in advance with operating gestures and formed as a neural network. A model comprising the algorithm is trained in advance with operating gestures, wherein a degree of error corresponding to the operating gestures is learned. To do so, all possible kinds of gesture are input on the input surface and trained until a degree of error can be allocated to each gesture with sufficient reliability. In the simplest case, only two states are assigned to each gesture as the degree of error, for example 0 for a reliable value and 1 for an unreliable value. In a modified embodiment, a more refined gradation of degrees of error with values of between 0 and 1 is ascertained and evaluated.

With the neural algorithm, further data, such as the finger contact surface, a finger contact force, a finger movement speed, and/or a speed gradient is taken into consideration in the training as input data, along with the pure position data of a gesture, whereby a classification with regards to the degree of error is considerably refined. An implemented model then delivers a corresponding classification after evaluating said characteristic data of the operating gestures.

In a further design of the method, the period of time, in which the control signals are withheld and not conveyed to the display unit, of from t2 to t2' is chosen to be greater with t2'≤t3 the greater the degree of error of the gesture is. If the degree of error is a maximum, t2'=t3 is chosen and reduced with a decreasing degree of error. The model based on learned data, such as the neural network, emits a minimum or maximum, i.e., for example 0 or 1, upon clearly recognizing the degree of error. Intermediary values come about if the model does not clearly recognize the degree of error; alternatively, gestures with corresponding intermediary values can also be trained in. It is thus advantageously achieved that the delay of the movement of the display element perceived by intermediary storage on the output unit is kept as low as possible.

In a further preferred embodiment, a movement direction is classified, along with a degree of error, based on the characteristic data of the operating gesture by means of the learned data of a model implemented as an algorithm trained in advance. To do so, the model is trained until a degree of error and a direction can be allocated with sufficient reliability to each gesture by means of the data, i.e., xy-value of the input position, contact surface, and force etc.

The comparison of the movement direction ascertained by the model and the real movement direction ascertained from the input positions enable a further differentiation when determining the period of time from t2 to t2'.

In an advantageous development, when the degree of error ascertained is above the predetermined threshold value and when a movement direction ascertained from the learned data corresponds to the actual movement direction ascertained from the input positions, the period of time for withholding the control signals is reduced from t2 to t3 or from t2 to t2'. Advantageously, a delay between gesture input and corresponding movement of the display element on the display unit can thus be reduced.

In a further embodiment, if the ascertained degree of error lies above the predetermined degree of error and the movement direction emitted by the algorithm trained in advance opposes the movement direction ascertained from the input positions POS(t1) to POS(tend), the control signals are withheld in the period of time from t2 to t2'=t3. So long as the ascertained degree of error lies above the predetermined degree of error, no control signals are emitted after the point in time t2. Advantageously, the unintentional selection of objects can thus be further reduced.

In a further design of the method, if the movement direction emitted by the algorithm trained in advance and formed as model is clear, the movement direction ascertained from the input positions POS(t1) to POS(tend) is overwritten by the movement direction recognized by the algorithm trained in advance. A clear recognition of the movement direction is present when the value emitted by the model for the movement direction lies above a minimum reliability value. With a movement direction recognition, 0 stands for a maximum reliable recognition, for example, and 1 for an unreliable recognition. Withholding the control signals in the period of time from t2 to t2' can be adjusted without taking the movement direction ascertained from the input positions POS(t1) to POS(tend) into consideration with a movement direction recognized as reliable by the model depending on the degree of error.

The device according to the invention comprises means which evaluate characteristic data of a gesture and classify the gesture continuously in relation to a degree of error by means of an algorithm trained in advance, wherein, so long as the degree of error lies below a predetermined threshold value, the means determine control signals from the input positions from POS(t1) to POS(tend) and continuously convey them to the display unit for controlling the display element, the means suspend conveying the control signals determined in the period of time of from t2 to t2'≤t3 upon recognizing a degree of error lying above the predetermined threshold value in the period of time from t2 to t3 with t1<t2<t3≤tend. Conveying the control signals to the display unit is continued after the point in time t2'. Along with the xy-coordinates of the input positions, the characteristic data of the gestures ideally comprises all measurable parameters describing the gesture, i.e., finger contact surface and change, implementation speed, speed gradient, finger contact force, etc. Advantageously, the recognition of a gesture with a degree of error lying above a threshold value avoids an unintentional selection of objects.

Further advantages, features and details emerge from the description below, in which—optionally with reference to the drawings—at least one exemplary embodiment is described in detail. Described and/or pictorially depicted features can form the subject matter of the invention on their own or in any meaningful combination, optionally also independently of the claims, and can, in particular additionally, also be the subject matter of one or more separate application/s. The same, similar or functionally identical parts are provided with the same reference numeral.

BRIEF DESCRIPTION OF THE DRAWING FIGURES

Figure 4:
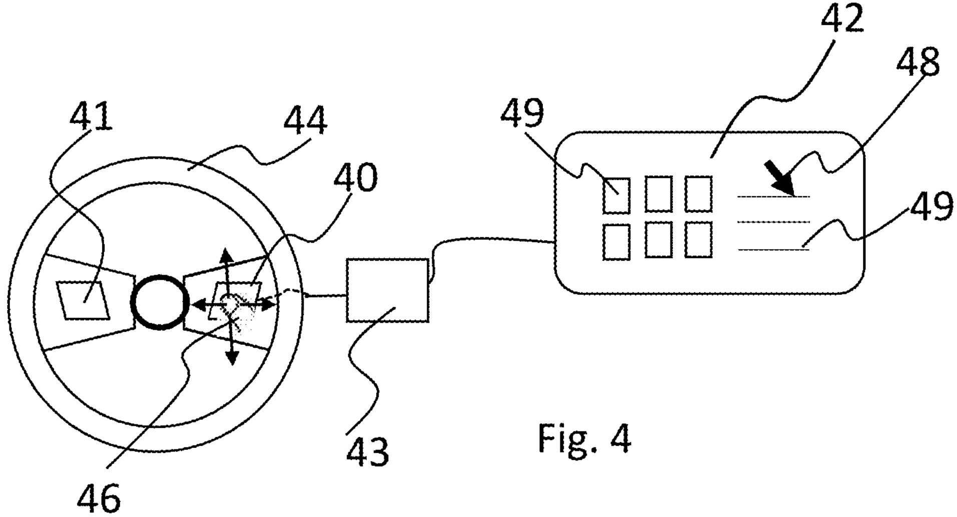

Here are shown:

FIG. 1 a flowchart of the method according to the invention,

FIGS. 2*a* to 2*h* exemplary depictions of deviations between a user's wish and gesture trajectories ascertained from input positions, FIG. 3 exemplary gestures in the xy-coordinate system and FIG. 4 device for carrying out the method according to the invention.

DETAILED DESCRIPTION

According to FIG. 1, in a first step S1, input positions of a gesture carried out with a touching means are ascertained on a touch-sensitive input surface. Here, the operating means is a finger or a thumb, for example, the touch-sensitive surface is designed as a capacitive touchpad. In step S3, control signals comprising shifting vectors for controlling a cursor on a display unit are ascertained using input positions received from S1.

In parallel in step S5, the input positions and, preferably, further measurement data are supplied to a model designed as a neural network. The further measurement data comprises a finger contact surface, a movement speed or corresponding gradient. A degree of error of the gestures is ascertained and classified from the measurement data by means of the neural network trained in advance with historic data.

In step S7, the degree of error of the gesture ascertained in S5 is compared to a predetermined threshold value. If the degree of error lies below a predetermined threshold value, then it assumed that the data is reliable and control signals determined from the measured input positions are continuously forwarded to a display unit for controlling the cursor, i.e., preferably if the control signals have a minimum change in relation to the predecessor signal, with each calculation cycle in step S9.

With a gesture classified as a degree of error lying below the predetermined threshold value, it is derived in S5 that the input positions measured on the input surface coincide with the actual desired finger positions of the user, in other words, here the movement of the finger must be carried out substantially without changing the contact surface and force in a straight line without tipping and must be free from artefacts, which are caused by physical properties of the sensor, for example edge effects.

If, in step S5, a degree of error of the gesture lying above a further threshold value is ascertained, then in step S7, emitting control signals to the display unit is suppressed, i.e., withheld, and reverted back to step S3. In step S3, new control signals are calculated based on the reverted control signals with new input positions obtained from step S1. The control signals are thus calculated with a greater number of input positions, such that input positions deviating from the user's wish or outliers can be filtered out or do not carry weight by averaging. Newly calculated control signals are withheld until the degree of error ascertained in S5 does not meet the predetermined threshold value or a timeout has expired.

Typically, neural networks do not deliver binary results, but instead a value between 0 and 1. If the network is now trained in such a way that "0" corresponds to the unproblematic state (small degree of error=high reliability) and "1" to the problematic state (high degree of error=low reliability), values lying in between can be interpreted as a degree of reliability of the received sensor data. Using this additional information, the timeout mentioned above, for example, can be determined in order to keep the delays as a result of the suppressed output as low as possible by intermediary storage of signals. An output value close to 0 would thus result in a short timeout, a value close to 1 in a long timeout.

In a further refined exemplary embodiment, the neural network is also trained in advance and set up to emit a movement direction of an input finger not only with regards to emitting a reliability, but rather by means of the data recorded in relation to an operating gesture. By comparing the directions that are respectively recognized by the neural network and by means of recorded input positions, a duration for withholding control signals in step S7 can be influenced in a more targeted manner. If the neural network classifies a movement with a high degree of error as unreliable and simultaneously recognizes a movement direction, which does not correspond to the direction calculated from the input positions, then the control signals are withheld and not conveyed to the display unit so long as the degree of error lies above the predetermined threshold value.

If the neural network classifies a movement as unreliable, yet recognizes a movement direction, which corresponds to the direction calculated from the input positions, the output of control signals may not have to be suppressed or not for as long. As a result, the delay on the display unit is kept low while at the same time there is an acceptable risk to reliability.

In this exemplary embodiment, the neural network has 5 outputs and, after evaluating the measured data belonging to a gesture, respectively gives a value of between 0 and 1, for example, for a gesture direction up, down to the right and left and a value for an undefined direction.

FIGS. 2*a* to 2*h* reproduce error cases in which the coordinate course ascertained from the position data deviates from the finger trajectory intended by the user. This deviation comes about by tipping, rolling, changing the contact force of the finger on the input surface and artefacts of the sensor. The finger movement desired by the user here always runs along the dashed line from point 1 to 2. The coordinate course ascertained from position data runs along the drawn-through line from point 1 to 2 or, if the desired end point and the end point ascertained from position data deviate from each other, from point 1 to 2'. The error cases are implemented in more detail below.

Illustrated in FIG. 2*a*: By positioning the finger in place too quickly, the fingertip distorts in such a way that initially a false movement direction is recognized, and the cursor jumps upwards instead of downwards, as desired.

Illustrated in FIG. 2*b*: The finger swipes beyond a sensor edge in the y-direction and only the projection in the x-direction is processed. Optionally, edge effects on the sensor edge lead to further distortions, thus the cursor jumps horizontally instead of vertically or optionally not at all.

Illustrated in FIG. 2*c*: When moving over a sensor aid on the sensor surface, the finger slips briefly and generates a movement orthogonal to the desired direction, thus the cursor jumps horizontally instead of vertically or even not at all.

Illustrated in FIG. 2*d*: If the user implements a gesture from below to above, for example, on the input surface with the thumb of a hand gripping the steering wheel rim, then the upwards movement specifies the intended finger trajectory, by rolling and tipping the thumb in this movement, the center of the area of the contact surface moves downwards, such that the movement direction ascertained from position data is opposite to the intended one. Thus, at least at the start of the movement, the direction is incorrectly recognized, thus the cursor does not move at all or even jumps downwards.

Illustrated in FIG. 2*e*: The user carries out a horizontal movement by rotating the thumb joint. Thus, the finger describes a curved trajectory, which deviates from the desired straight line, thus the cursor jumps orthogonally to the desired direction.

Illustrated in FIGS. 2*f* and 2*g*: Unfavorably chosen parameter settings lead to the measured finger position jumping between two fixed values.

Illustrated in FIG. 2*h*: Rolling the finger when pressing the button leads to an apparent downwards movement, thus the cursor unwantedly jumps downwards.

FIG. 3 illustrates xy-coordinates of input positions of an exemplary gesture 30 on an input surface. At a point in time t1, the gesture begins at Pos(t1) and ends at point in time tend at Pos(tend). In parallel to recording the positions, the course of the gesture is evaluated by means of learned data, for example with a neural network trained in advance, continuously with reference to a degree of error indicated by the graph 32. In the present example, the degree of error of the positions ascertained between t1 to t2, i.e., between Pos(t1) to Pos(t2), lies below a predetermined threshold value 34, i.e., shifting vectors ascertained from this position data are continuously conveyed to the display unit with each calculation cycle for controlling a display element.

In the period of time from t2 to t3, the degree of error 32 exceeds the predetermined threshold value 34. Depending on the extent of the degree of error, the input positions ascertained in this period of time are withheld from t2 to t2' or, as a maximum, until t3; in this period of time, control signals are calculated but not emitted to the display unit. If, as depicted, the degree of error is high, i.e., either 1 or at least close to 1, then the control signals are continuously calculated until t3 but not emitted, i.e., withheld. The closer the degree of error lies to the predetermined threshold value 34, the smaller the period of time t2 to t2' is chosen to withhold the control signals. The period of time is defined, for example, by a timeout, i.e., here a duration of time depending on the degree of error is defined from t2 to t2', wherein when a period of time has elapsed at point in time t2', the control signals are emitted to the display unit again.

As soon as the degree of error sinks below the predetermined threshold value, i.e., even before t2' or before the period of time has elapsed or before reaching the timeout, the control signals are correspondingly continuously emitted again.

In the period of time after t3 to tend, the degree of error 32 again lies below the threshold value 34, thus the control signals ascertained from the input positions are again conveyed to the display unit without delay with each calculation cycle. If, as described above, withholding is already ended by a period of time elapsing before t3 at the point in time t2', conveying the control signals to the display unit is correspondingly already carried out in the period of time from t2' to tend.

In FIG. 4, a device for carrying out the method described above is depicted. The device comprises touch-sensitive input surfaces 40, 41, which are connected to a display unit 42 via evaluation means 43. The input surfaces 40,41 are here arranged on a steering wheel 44 and can be operated with a finger, presently with a thumb 46, by swiping movements. A display element 48 implemented as a cursor for selecting an object 49, which is formed as an icon or list, for example, is selected via random movements of the thumb 46 depicted by arrows. Upon selecting the object 49, this is optically identified. In an embodiment, an allocated function is already implemented upon the identification; in an alternative embodiment, only a further operating action, such as triggering a switching function by means of a pressure increase on the input field 40, causes the implementation of the function allocated to the object 49.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for evaluating operating gestures on a touch-sensitive input surface to control a display element configured to select an object on a display unit assigned to the touch-sensitive input surface, the method comprising:

determining characteristic data belonging to an operating gesture in a period of time from a point in time t1 until a point in time t_end, wherein t1<t_end;

continuously determining control signals having displacement vectors from input positions in the characteristic data of POS(t1) to POS(t_end) to control the display element on the display unit;

evaluating, in parallel with the continuously determining control signals having the displacement vectors, the characteristic data belonging to the operating gesture and classifying the operating gesture regarding a degree of error using a pre-trained algorithm;

conveying the determined control signals to the display unit when the degree of error lies below a predetermined threshold value; and suspending the conveying of the control signals, when the degree of error in a period of time from t2 to t3 is above the predetermined threshold value, during a period of time from t2 to t3, wherein t1<t2<t3≤t_end.

2. The method of claim 1, wherein the pre-trained algorithm is trained in advance with operating gestures and is a neural network.

3. The method of claim 1, wherein the characteristic data for the classifying of the operating gesture additionally comprises a finger contact surface, a finger contact force, or finger movement speed.

4. The method of claim 1, wherein the conveying of the control signals in the period of time from t2 to t3 is only suspended in a period of time from t2 to t2' when a timer expires at t2', wherein t2'<t3.

5. The method of claim 1, wherein the conveying of the control signals in the period of time from t2 to t3 is only suspended in a period of time from t2 to t2' based on the degree of error, wherein t2'<t3, and wherein a longer a time period from t2 to t2' in which the conveying of the control signals is suspended, a greater a degree of error of the operating gesture, wherein t2'≤t3.

6. The method of claim 1, wherein, in addition to the degree of error, the pre-trained algorithm classifies a movement direction based on the characteristic data.

7. The method of claim 6, wherein when the determined degree of error is above the predetermined degree of error and the movement direction output by the pre-trained algorithm corresponds to the movement direction determined from the input positions POS(t1) to POS(t_end), the period of time for suspending the conveying of the control signals from t2 to t2' is reduced.

8. The method of claim 6, wherein when the movement direction output by the pre-trained algorithm is unambiguous, the movement direction determined from the input positions POS(t1) to POS(t_end) is overwritten by the movement direction recognized by the pre-trained algorithm.

9. A device, comprising:

an evaluating device configured to evaluate operating gestures on a touch-sensitive input surface configured to control a display element to select an object on a display unit allocated to the input surface, wherein the evaluating device is configured to determine characteristic data belonging to an operating gesture in a period of time from a point in time t1 until a point in time t_end, wherein t1<t_end;

continuously determine control signals having displacement vectors from input positions in the characteristic data of POS(t1) to POS(t_end) to control the display element on the display unit;

evaluate, in parallel with the continuously determining control signals having the displacement vectors, the characteristic data belonging to the operating gesture and classifying the operating gesture regarding a degree of error using a pre-trained algorithm;

convey the determined control signals to the display unit when the degree of error lies below a predetermined threshold value; and suspend the conveying of the control signals, when the degree of error in a period of time from t2 to t3 is above the predetermined threshold value, during a period of time from t2 to t3, wherein t1<t2<t3≤t_end.

* * * * *